United States Patent [19]
Murata et al.

[11] Patent Number: 5,406,920
[45] Date of Patent: Apr. 18, 1995

[54] APPARATUS FOR CONTROLLING THE POSITION OF CONTROL MEMBER

[75] Inventors: Kuniaki Murata; Takashi Nishihara; Osamu Yamamoto, all of Saitama, Japan

[73] Assignee: Honda Giken Kogyo Kabushiki Kaisha, Tokyo, Japan

[21] Appl. No.: 169,125

[22] Filed: Dec. 20, 1993

[30] Foreign Application Priority Data

Dec. 21, 1992 [JP] Japan .................................. 4-340357

[51] Int. Cl.⁶ ............................................... F02D 7/00
[52] U.S. Cl. ................................................. 123/399
[58] Field of Search ................ 123/399, 397, 417, 478, 123/480, 361, 350, 335, 361; 364/431.05, 431.06, 431.07, 431.08

[56] References Cited

U.S. PATENT DOCUMENTS

| 5,235,951 | 8/1993 | Taguchi et al. | 123/397 |
| 5,327,865 | 7/1994 | Riehmann | 123/397 |
| 5,333,584 | 8/1994 | Kamio et al. | 123/399 |
| 5,339,782 | 8/1994 | Golzer et al. | 123/399 |
| 5,349,932 | 9/1994 | Boverie et al. | 123/399 |

Primary Examiner—Raymond A. Nelli
Attorney, Agent, or Firm—Nikaido, Marmelstein, Murray & Oram

[57] ABSTRACT

An apparatus for controlling a DC motor connected to an intake throttle valve in an internal combustion engine to detect an actual opening degree of the intake throttle valve and to match the actual opening degree with a command opening degree. The apparatus includes a feedback loop for defining a feedback signal indicative of a command to converge the actual opening degree of the control member to the command opening degree by reception of the command opening degree delivered by a command opening degree generating means and the actual opening degree delivered by an actual opening degree detecting means, a combined-signal generating means for combining the feedback signal defined by the feedback loop with the command opening degree delivered by the command opening degree generating means, and a motor driving means for driving the DC motor in response to an output from the combined-signal generating means. Thus, it is possible to converge the actual opening degree of the intake throttle valve to the command opening degree with a good responsiveness and a good positioning accuracy.

8 Claims, 3 Drawing Sheets

APPARATUS FOR CONTROLLING THE POSITION OF CONTROL MEMBER

BACKGROUND OF THE INVENTION

1. Field of the Invention

The present invention relates to an apparatus for controlling the position of a control member which controls such as the opening degree of an intake throttle valve in an internal combustion engine and the like by means of a DC motor.

2. Description of the Prior Art

In an apparatus for electrically controlling the opening degree of an intake throttle valve in an internal combustion engine, a technique has been conventionally employed, which comprises detecting an actual opening degree of the intake throttle valve by a sensor, and performing a PID feedback control of the DC motor connected to the intake throttle valve so as to converge, into zero, a deviation between a command opening degree for the intake throttle valve and the detected actual opening degree.

However, the above described prior art technique using the PID feedback suffers from a problem that if the responsiveness of the opening degree of the intake throttle valve is intended to be increased, the convergence is poor, and if the convergence is intended to be increased, the responsiveness is poor.

SUMMARY OF THE INVENTION

Accordingly, it is an object of the present invention to provide an apparatus for controlling the position of a control member using an exact model matching (which will be referred to as EMM hereinafter) technique, which has excellent responsiveness and convergence and which is not liable to be influenced by a variation in environment around the control member and the DC motor and by a deterioration with age.

To achieve the above object, according to the present invention, there is provided an apparatus for controlling the position of a control member, including a control member for controlling the amount of intake air or the amount of fuel supply to an internal combustion engine, a DC motor for driving and positioning the control member, a command position generating means for delivering a command position for the control member, and an actual position detecting means for detecting an actual position of the control member, the apparatus further comprising: a feedback loop for defining a feedback signal indicative of a command to converge the actual position of the control member to the command position with input of the command position delivered by the command position generating means and the actual position delivered by the actual position detecting means; a combined-signal generating means for combining the feedback signal defined by the feedback loop with the command position delivered by the command position generating means; and a motor driving means for driving the DC motor in response to an output from the combined-signal generating means.

With the above arrangement, by using the feedback loop for defining the feedback signal indicative of a command to converge the actual position of the control member to the command position, and using the combined-signal generating means for combining the feedback signal with the command position, it is ensured that the command position can be adjusted to a value according to the characteristic of the DC motor in response to the feedback signal, so that the position of the control member valve can promptly be converged toward the command position without being vibrated.

In addition, according to the present invention, there is provided an apparatus for controlling the position of a control member, including a control member for controlling the amount of intake air or the amount of fuel supply to an internal combustion engine, a DC motor for driving and positioning the control member, a command position generating means for delivering a command position for the control member, and an actual position detecting means for detecting an actual position of the control member, the apparatus further comprising: a feedforward loop for defining a feedforward signal including a primary delay system on the basis of the command position delivered by the command position generating means; a feedback loop for defining a feedback signal according to an equation derived from a 2- or 3-degree pulse transfer function which converges the actual position of the control member to the command position, with inpur an output from the feedforward loop and the actual position delivered by the actual position detecting means; and a motor driving means for driving the DC motor in response to the feedforward signal and the feedback signal.

With the above arrangement, by using the feedforward loop for defining the feedforward signal on the basis of the command position delivered by the command position generating means and the feedback loop for defining the feedback signal indicative of a command to converge the actual position of the control member to the command position, it is ensured that the position of the control member can be converged to the command position with a good responsiveness and a good positioning accuracy.

Further, according to the present invention, there is provided an apparatus for controlling the position of a control member, including a control member for controlling the amount of intake air or the amount of fuel supply to an internal combustion engine, a DC motor for driving and positioning the control member, a command position generating means for delivering a command position for the control member, and an actual position detecting means for detecting an actual position of the control member, the apparatus further comprising: a feedback loop for defining a feedback signal for converging the actual position of the control member to the command position with input of the command position delivered by the command position generating means, the actual position delivered by the actual position detecting means, and a last value of the feedback signal; a second feedback control section for delivering a proportioning control term or an integrating control term on the basis of a deviation between an output from the command position generating means and an output from the actual position detecting means; a selecting means for selecting one of an output from the feedback loop and an output from the second feedback control section in accordance with a magnitude of the deviation; and a motor driving means for driving the DC motor in response to an output from the selecting means.

With the above arrangement, by using the selecting means for selecting any one of the feedback signal indicative of a command to converge the actual position of the control member into the command position and the output from the second feedback control section for outputting the proportioning control term or the integrating control term on the basis of the deviation between the actual position and the command position, it is ensured that the position of the control member can promptly be converged toward the command position by the operation of the feedback loop without being vibrated, when the deviation is large, and that the position of the control member can accurately be converged toward the command position by the operation of the second feedback control section having a lowered response speed and an increased convergence, after the deviation has been decreased. This enables a control with excellent convergence and responsiveness without being influenced by a variation in environment around the control member and the DC motor, a deterioration with age or the like.

The above and other objects, features and advantages of the invention will become apparent from the following description of a preferred embodiment, taken in conjunction with the accompanying drawings.

BRIEF DESCRIPTION OF THE DRAWINGS

FIGS. 1 to 3 illustrate a preferred embodiment of the present invention, wherein FIG. 1 is a block diagram of an apparatus for controlling the opening degree of an intake throttle valve;

FIG. 2 is a diagram of a modeled DC motor; and

FIG. 3 is a block diagram illustrating a pulse transfer function for the apparatus for controlling the opening degree of the intake throttle valve.

DESCRIPTION OF THE PREFERRED EMBODIMENTS

The present invention will now be described by way of a preferred embodiment in connection with the accompanying drawings.

Figure 1:
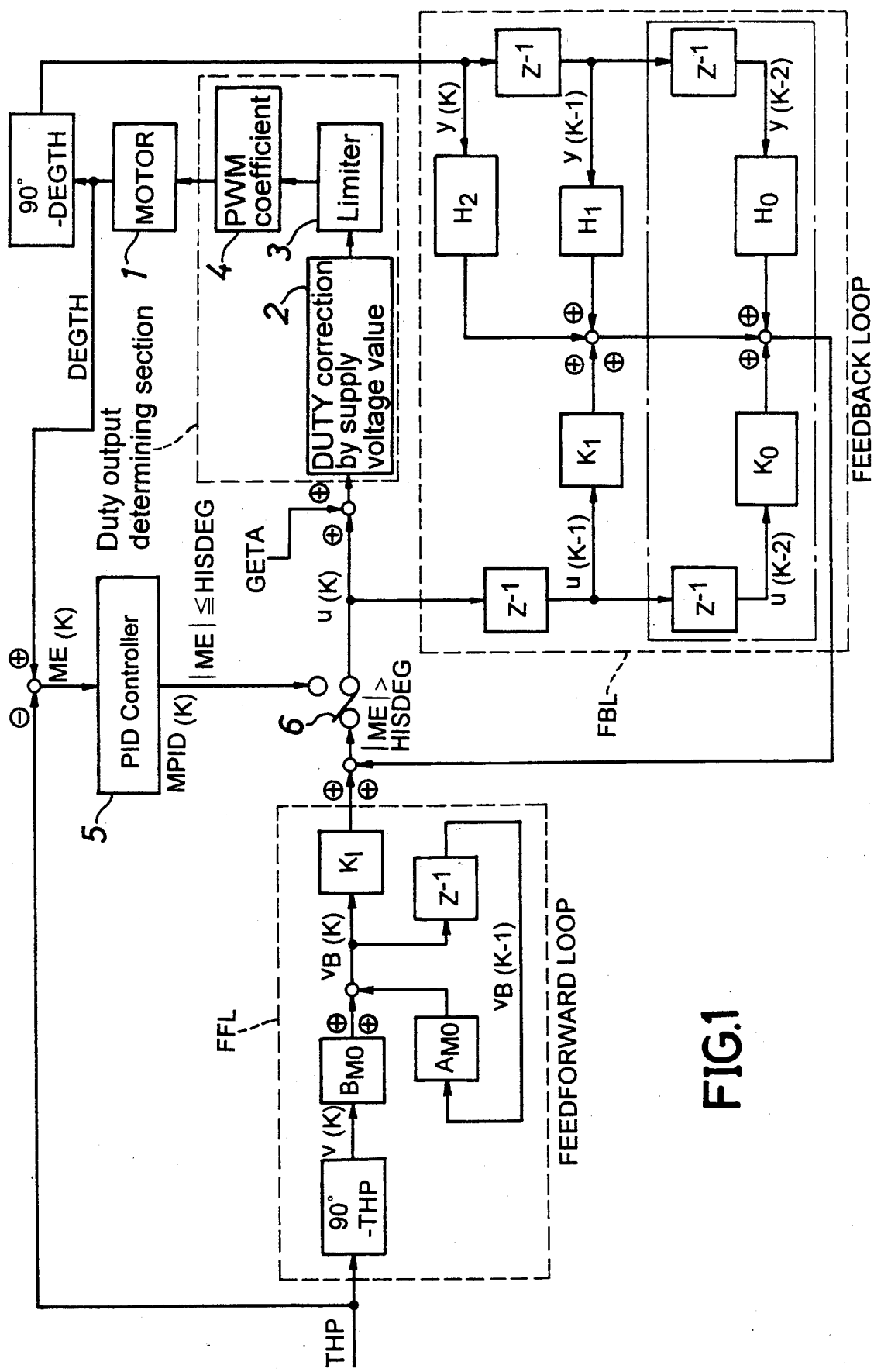

FIG. 1 shows an apparatus for controlling the opening degree of an intake throttle valve. This apparatus controls the driving of a DC motor 1 connected to the intake throttle valve to converge the actual opening degree DEGTH of the intake throttle valve into a target opening degree THP which is determined on the basis of an output from an accelerator pedal opening degree sensor.

The target opening degree THP is a value which is determined on the basis of an output from an accelerator pedal opening degree sensor. But in addition to this value, when an excessive slipping of a driving wheel has been detected, is an opening degree suitable for the maximum driving torque transmittable in a current road surface condition by the driving wheel is calculated for the purpose of reducing the excessive slipping, such opening degree can also be employed as the target opening degree THP. An opening degree, which is commanded for a so-called auto-cruising and at which a constant vehicle speed is maintained by a manual operation performed when a vehicle speed desired by an driver has been reached, can be also employed as the target opening degree THP.

The intake throttle valve opening degree control apparatus is comprised of a duty output determining section, an EMM control system and a PID control system. The duty output determining section includes a duty correcting circuit 2 for compensating for a variation in voltage of a battery mounted in a vehicle for supplying an electric power to the DC motor 1, a limiter 3 for restraining upper and lower limits of a command value to the DC motor 1, and a PWM conversion circuit 4 for controlling the driving of the DC motor 1 in accordance with the pulse width modulated by a PWM conversion. Further, a bias voltage GETA for compensating for a biasing force of a return spring in a closed position of the intake throttle valve is applied to an input of the duty output determining section. The actual opening degree DEGTH of the intake throttle valve which is opened and closed by the DC motor 1 is detected by a sensor such as a potentiometer or the like mounted on the DC motor 1 or the intake throttle valve.

The EMM control system is comprised of a feedforward loop FFL and a feedback loop FBL. The PID control system is comprised of a well-known PID controller 5 and is designed mainly for enhancing the convergence rather than the responsiveness. Reference character 6 is a means for switching-over the EMM control system and the PID control system from one to another. This switch-over means 6 compares a predetermined threshold value HISDEG and an absolute value |ME| of a deviation ME between the target opening degree THP and the actual opening degree DEGTH, and if |ME| > HISDEG as a result of the comparison, the switch-over means 6 connects the EMM control system to the duty output determining section, and if |ME| > HISDEG, the switch-over means 6 connects the PID control system to the duty output determining section.

The EMM control system is designed in the following manner: It is known that a control system operative to drive the intake throttle valve by the DC motor 1 intrinsically has a response delay. Therefore, even if the target opening degree THP is stepwise provided, the control system cannot response this. Thereupon, an ideal response characteristic for the intake throttle valve is defined as a reference model, and a transfer function of the reference model is determined so that this response characteristic is obtained. In usual, it is desirable that a control system for controlling the position of the intake throttle valve is a system which is not vibrated and therefore, if the reference model is designed employing a primary delay, herein for the purpose of simplifying the calculation, a pulse transfer function provided when the reference model is dispersed is represented by a following equation:

$$td(Z) = b_{mo}/(Z - a_{mo}) \qquad (1)$$

The feedforward loop FFL and the feedback loop FBL are designed to provide a responsiveness such that the opening degree of the intake throttle valve is matched to the reference model. An influence is exerted to the responsiveness mainly due to an involution or regression property of the feedforward loop FFL. The pulse transfer function is shown as the FFL sections in a block diagram in FIGS. 1 and 3. The feedback loop FBL functions to promptly converge the output into a desired value according to a function comprised of an input (u(K) in FIG.3) and an output (y(K) in FIG.3), when a disturbance or the like has been generated. The feedback loop FBL is designed in the following manner.

Figure 2:
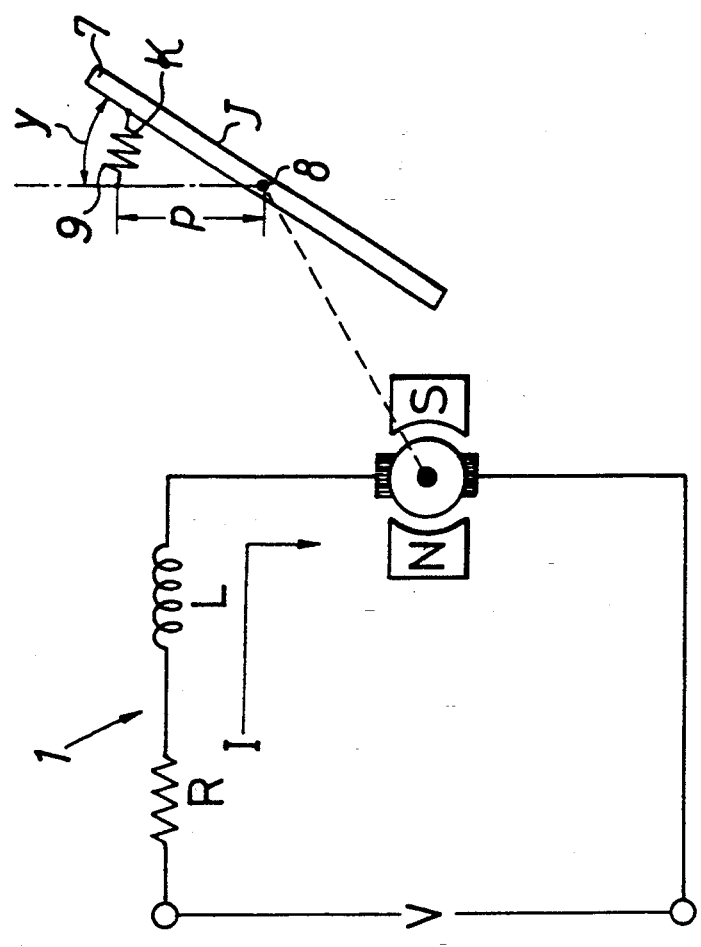

FIG.2 is a diagram of the DC motor 1 and intake throttle valve system, wherein reference character 7 designates an intake throttle valve which is coupled to an output shaft of the DC motor 1 by a single arm rotatable about an axis 8. A return spring 9 biases the intake throttle valve toward a closed position, and is connected to the axis 8 of the output shaft 7. If this diagram is physically modeled, an electric relation established with regard to the DC motor 1 represented by a following equation:

$$RI + L\,(dI/dt) + k_E\,(dy/dt) = V \tag{2}$$

An equation of motion for the DC motor 1 is given by a following equation:

$$J\,(d^2y/dt^2) = k_T I - \kappa p y \tag{3}$$

wherein,
V: the terminal voltage
y: the rotational angle of the output shaft
I: the armature nature current
R: the armature resistance
L: the armature inductance
J: the inertia moment
$k_E$: the counter electromotive force factor
$k_T$: the torque factor
$\kappa$: the spring constant
p: the distance from the shaft to the spring If the equations (2) and (3) are Laplace-transformed, following equations (4) and (5) are given, respectively:

$$(R + LS)I + k_E y S = V \tag{4}$$

$$(JS^2 + \kappa p) y = k_T I \tag{5}$$

Therefore, if a transfer function t(S) is found from the equations (4) and (5) by use of the terminal voltage V as an input and the rotational angle y of the output shaft as an output, a following equation is given:

$$\begin{aligned} t(S) &= y(S)/V(S) \\ &= k_T/\{JLS^3 + JRS^2 + (\kappa pL + k_E k_T)S + \kappa pR\} \\ \text{def} &= B_0/(S^3 + A_2 S^2 + A_1 S + A_0) \end{aligned} \tag{6}$$

The control of the intake throttle valve is carried out by a digital computer, wherein a handled signal is a dispersion system and hence, if the pulse transfer function t(Z) is found by dispersion the equation (6), a following equation is given:

$$t(Z) = (b_2 Z^2 + b_1 Z + b_0)/(Z^3 + a_2 Z^2 + a_1 Z + a_0) \tag{7}$$

Figure 3:
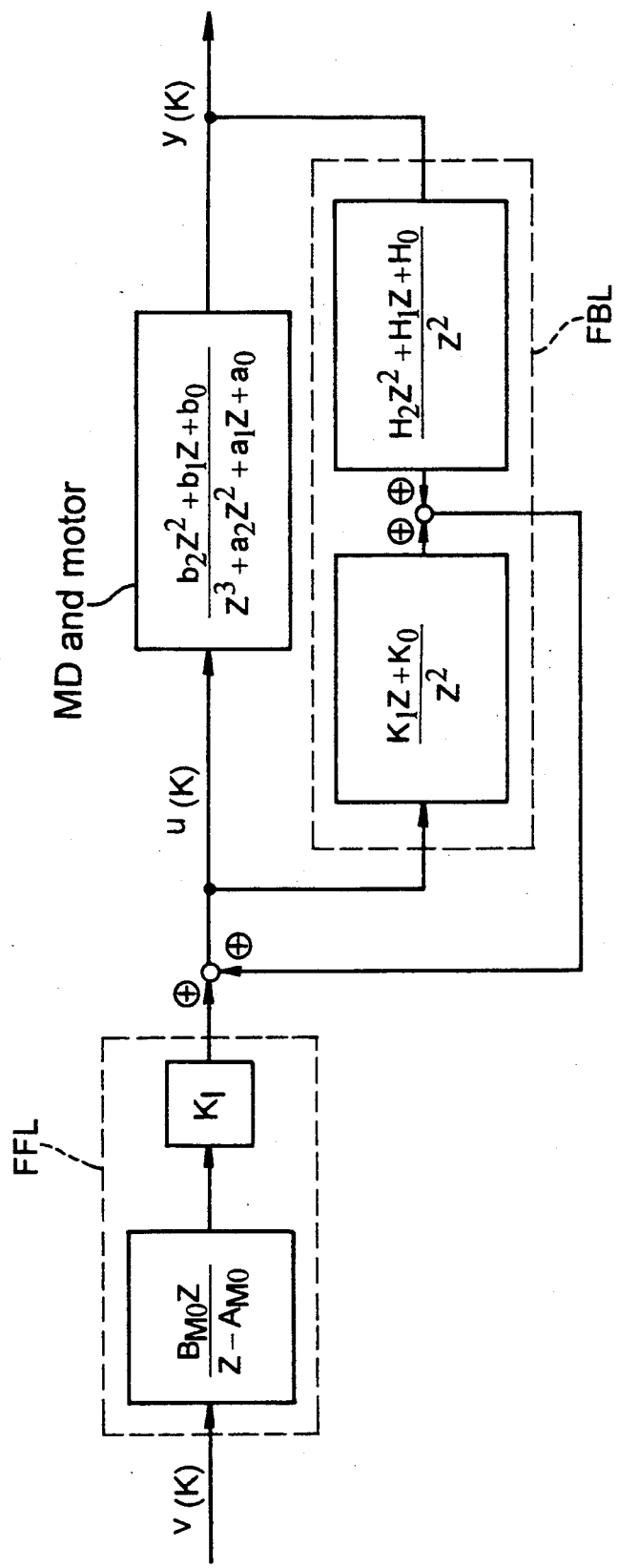

That is, the pulse transfer function of the physical model diagrammed in FIG. 2 is given as the equation (7) and hence, MD in FIG. 3 represents the modeled DC motor 1 and intake throttle valve control system. Since the DC motor 1 and intake throttle valve control system is provided as the pulse transfer function, an illustration of the arrangement of the feedback loop FBL determined by the pulse transfer function in the block diagram is an FBL section in each of FIGS. 1 and 3.

A technique of designing the EMM comprised of the feedforward loop FFL and the feedback loop FBL will be described below. The designing technique described herein is described in detail in "Theory of Design of Control System ( this is a direct translation from the original Japanese title)" by Kunihiko Ichikawa, Sep. 20, 1989 from Gijutsu Shoin.

First, the t(Z) in the equation (7) is defined as t(Z)=b(Z)/a (Z) . The above-described equation (6) is a 3-degree system. Therefore, if a corresponding EMM system is designed, it is defined that $\gamma(Z)$ (n-m degree stable polynomial)=Z and q(Z) (n-1 degree stable polynomial)=$Z^2$, and there are given $K(Z) = K_1 Z + K_0$, and $H(Z) = H_2 Z^2 + H_1 Z + H_0$, because the degree n of b(Z) is equal to 3 (n=3), and the degree m of a(Z) is equal to 2 (m=2). This equation corresponds to the diagram of the feedback loop FBL shown in FIG. 1. Diophantine equation obtained from this equation (6) is as follows:

$$(K_1 Z + K_0)(Z^3 + a_2 Z^2 + a_1 Z + a_0) + \tag{8}$$

$$(H_2 Z^2 + H_1 Z + H_0)(b_2 Z^2 + b_1 Z + b_0) =$$

$$Z^2 \left[ (Z^3 + a_2 Z^2 + a_1 Z + a_0) - \frac{1}{b_2} Z(b_2 Z^2 + b_1 Z + b_0) \right]$$

Each of the K(Z) and H(Z) is determined to be a single value from the equation (8). And the following control law using the K(Z) and H(Z) is given:

$$u_{(K)} = \frac{K(Z)}{Z^2} u_{(K)} + \frac{H(Z)}{Z} y_{(K)} + \frac{1}{Kt} \gamma(Z) t d(Z) v_{(K)} \tag{9}$$

thereby achieving a desired EMM. It should be noted that $1/k_t = K_I$ in FIGS. 1 and 3, wherein $k_t$ is a maximum degree factor of b(Z), and is $b_2$ herein.

The feedforward loop FFL and the feedback loop FBL designed in the above-described manner ensure that in the feedforward loop FFL, the speed of response of the opening degree of the intake throttle valve can be adjusted at any value in accordance with the characteristic or the like of the DC motor 1 by filtering the target opening degree THP of the intake throttle valve to deliver the filtered opening degree to a motor driving circuit MD. If the value of a constant AM0 in the pulse transfer function of the feedforward loop FFL is set at 0, the delay of an input/output characteristic can be minimized. In addition, the feedback loop FBL sets the zero point of the motor driving circuit MD and the $\gamma(Z)$ of the feedforward loop FFL in such a manner that they are offset, and the operations of both the feedforward loop FFL and the feedback loop FBL enable the opening degree of the intake throttle valve to be matched to as desired.

If the absolute value |ME| of the deviation ME between the target opening degree THP and the actual opening degree DEGTH is larger than the predetermined threshold value HISDEG, the opening degree of the intake throttle valve can be matched to a desired value by the EMM control system. With the EMM control system, it is difficult, due to the ununiformity in characteristic of the DC motor 1 and a variation in environment, that a final opening degree of the intake throttle valve is completely matched to the target opening degree THP. However, if the absolute value |ME| of the deviation ME becomes smaller than the threshold value HISDEG, the opening degree of the intake throttle valve can accurately be matched to the target opening degree THP by connecting the PID control system to the motor driving circuit MD.

In the diagram of the DC motor 1 and the intake throttle valve system shown in FIG. 2, the pulse transfer function is determined in consideration of armature inductance L of the DC motor 1 and the intake throttle valve system. However, in general, the size of the DC motor 1 for driving the intake throttle valve may be small, and the armature inductance L is so small that it can be ignored. Therefore, if this armature inductance L is neglected, the transfer function t(S) of the equation (6) is of a 2-degree. This enables a portion of the feedback loop FBL surrounded by a one-dot dashed line in FIG. 1 to be omitted, thereby simplifying the control system.

If the armature inductance L of the DC motor 1 is ignored in this manner, it is defined that $\gamma(Z)$ (n-m degree stable polynomial)$=Z$, and q(Z) (n-1 degree stable polynomial)$=Z$, and $K(Z)=K_0$ and $H(Z)=H_1Z+H_0$ are given, because n$=2$ and m$=1$. The pulse transfer function td(Z) of the reference model may be the same as the above-described 3-degree. In this case, Diophantine equation is as follows:

$$K_0(Z^2 + a_1Z + a_0) + (H_1Z + H_0)(b_1Z + b_0) = \qquad (10)$$

$$Z\left[(Z^2 + a_1Z + a_0) - \frac{1}{b_1}Z(b_1Z + b_0)\right]$$

Each of the K(Z) and H(Z) is determined to be a single value from the equation (10). And the following control law using these K(Z) and H(Z) is provided:

$$u_{(K)} = \frac{K(Z)}{Z}u_{(K)} + \frac{H(Z)}{Z}y_{(K)} + \frac{1}{K_t}\gamma(Z)td(Z)v_{(K)} \qquad (11)$$

thereby achieving a desired EMM.

Even if the armature inductance L is ignored to change the equation into a 2-degree system in this manner, an effect compared with that in the 3-degree system is provided in the intake throttle valve control system, and moreover, the control system can be simplified.

The EMM is achieved by the equation (9) or (11), as described above, but it will be easily appreciated that in the digital computer which actually performs the control, the calculation is carried out in the form of an equation (12) or an equation (13), respectively.

$$u_{(K)}=K_1u_{(K-1)}+K_0u_{(K-2)}+H_2y_{(K)}+H_1y_{(K-1)}+H_0y_{(K-2)}+A_{M0}v_{B(K-1)}+(B_{M0}/K_t)v_{(K)} \qquad (12)$$

$$u_{(K)}=K_0u_{(K-1)}+H_1y_{(K)}+H_0y_{(K-1)}+A_{M0}v_{B(K-1)}+(B_{M0}/K_t)v_{(K)} \qquad (13)$$

In this connection, the first to fifth terms in the right side of the equation (12) correspond to the feedforward loop, and the sixth and seventh terms correspond to the feedforward loop. In the equation (13), the first to third terms in the right side thereof correspond to the feedback loop, and the fourth and fifth terms correspond to the feedforward loop. In the above equations, each of $K_1$, $K_0$, $H_2$, $H_1$, $H_0$, $A_{M0}$, $B_{M0}$ and $K_t$ is a constant.

Elements (90°-THP) and (90°-DEGTH) are provided in an input portion for the target opening degree THP of the intake throttle valve and in an output portion of the DC motor 1 shown in FIG. 1. They are provided respectively, for example, upstream or downstream of a commonly known main throttle valve mechanically connected to the accelerator pedal, if the control system is designed with the opening degree from the fully closed position of the intake throttle valve. These elements are converting expression if the fully opened position is designed to be in a non-energized state, when controlling, by the DC motor, a second throttle valve which is normally maintained at a fully opened state and is closed to a target opening degree corresponding to a torque transmittable during excessive slipping of a driving wheel. These elements are not required when the throttle valve is maintained in its fully closed position during non-energization of the DC motor 1.

In addition, the PID controller 5 need not perform all the operations of proportioning, integration and differentiation. The PID controller 5 may perform at least one of these operations can be adopted, if necessary.

Further, the present invention is not limited to the control of the opening degree of the intake throttle valve, and is also applicable, for example, to the control of the rack position of a fuel injection pump for a diesel engine.

What is claimed is:

1. An apparatus for controlling the position of a control member, including a control member for controlling the amount of intake air or the amount of fuel supply to an internal combustion engine, a DC motor for driving and positioning the control member, a command position generating means for delivering a command position for the control member, and an actual position detecting means for detecting an actual position of the control member said apparatus further comprising:

a feedback loop for defining a feedback signal indicative of a command to converge the actual position of the control member to the command position with input of the command position delivered by said command position generating means and the actual position delivered by said actual position detecting means;

a combined-signal generating means for combining the feedback signal defined by said feedback loop with the command position delivered by said command position generating means; and a motor driving means for driving said DC motor in response to an output from said combined-signal generating means.

2. An apparatus for controlling the position of a control member according to claim 1, further including a feedforward loop for subjecting the command position delivered by said command position generating means to a filtering process including a primary delay system to deliver a filtered command position to said combined-signal generating means.

3. An apparatus for controlling the position of a control member according to claim 1 or 2, further including a PID controller which is input with a deviation between the command position delivered by said command position generating means and the actual position delivered by said actual position detecting means, and a switch-over means for comparing said deviation with a predetermined threshold value to deliver one of an output from said PID controller and the output from said combined-signal generating means to said motor driving means.

4. An apparatus for controlling the position of a control member according to claim 1, wherein said feedback loop receives a last value of the output from said combined-signal generating means, as well as a current value and a last value of the actual position delivered by said actual position detecting means.

5. An apparatus for controlling the position of a control member, including a control member for controlling the amount of intake air or the amount of fuel supply to an internal combustion engine, a DC motor for driving and positioning the control member, a command position generating means for delivering a command position for the control member, and an actual position detecting means for detecting an actual position of the control member, said apparatus further comprising:
- a feedforward loop for defining a feedforward signal including a primary delay system on the basis of the command position delivered by said command position generating means;
- a feedback loop for defining a feedback signal according to an equation derived from a 2- or 3-degree pulse transfer function which converges the actual position of the control member to the command position, with input of an output from said feedforward loop and the actual position delivered by said actual position detecting means; and
- a motor driving means for driving said DC motor in response to said feedforward signal and said feedback signal.

6. An apparatus for controlling the position of a control member according to claim 5, wherein said control member includes a biasing means for biasing the position of said control member to an initial position, when said DC motor is in a non-energized state, and an adding means for adding a predetermined value corresponding to a biasing force of said biasing means to an input of said motor driving means.

7. An apparatus for controlling the position of a control member, including a control member for controlling the amount of intake air or the amount of fuel supply to an internal combustion engine, a DC motor for driving and positioning the control member, a command position generating means for delivering a command position for the control member, and an actual position detecting means for detecting an actual position of the control member, said apparatus further comprising:
- a feedback loop for defining a feedback signal for converging the actual position of the control member to the command position with input of the command position delivered by said command position generating means, the actual position delivered by said actual position detecting means, and a last value of the feedback signal;
- a second feedback control section for delivering a proportioning control term or an integrating control term on the basis of a deviation between an output from said command position generating means and an output from said actual position detecting means;
- a selecting means for selecting one of an output from said feedback loop and an output from said second feedback control section in accordance with a magnitude of said deviation; and
- a motor driving means for driving said DC motor in response to an output from said selecting means.

8. An apparatus for controlling the position of a control member according to claim 7, wherein said feedback loop defines the feedback signal according to an equation derived from a 2- or 3-degree pulse transfer function.

* * * * *